United States Patent
Hammer et al.

(10) Patent No.: US 10,550,871 B2
(45) Date of Patent: Feb. 4, 2020

(54) METHOD FOR PRODUCING A COMPONENT CONNECTION AND COMPONENT CONNECTION

(71) Applicant: Bayerische Motoren Werke Aktiengesellschaft, Munich (DE)

(72) Inventors: Maik Hammer, Bruckberg (DE); Johann Van Niekerk, Munich (DE); Jan Andreas Pfrang, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 386 days.

(21) Appl. No.: 15/434,096

(22) Filed: Feb. 16, 2017

(65) Prior Publication Data

US 2017/0159694 A1    Jun. 8, 2017

Related U.S. Application Data

(63) Continuation of application No. PCT/EP2015/069117, filed on Aug. 20, 2015.

(30) Foreign Application Priority Data

Sep. 8, 2014  (DE) .......... 10 2014 217 895

(51) Int. Cl.
  *B23K 26/21*  (2014.01)
  *B29C 65/16*  (2006.01)
  (Continued)

(52) U.S. Cl.
  CPC ............... *F16B 5/01* (2013.01); *B23K 26/21* (2015.10); *B29C 65/16* (2013.01); *B29C 65/48* (2013.01);
  (Continued)

(58) Field of Classification Search
  CPC ......... B23K 26/21; B29C 65/16; B29C 65/48; B26L 2031/3005; B26L 2031/3055;
  (Continued)

(56) References Cited

U.S. PATENT DOCUMENTS 4,637,116 A    1/1987 Paerisch et al.
9,296,923 B2 *  3/2016 Herzinger ............. F16B 11/006
(Continued)

FOREIGN PATENT DOCUMENTS

CN    1847674 A    10/2006
DE    34 41 349 A1   5/1986
(Continued)

OTHER PUBLICATIONS

Specification Translation of DE 102012101913. Sieg, et al. Lightweight sheet and a lightweight sheet metal comprehensive construction. Sep. 12, 2013.*

(Continued)

*Primary Examiner* — Josh Skroupa
(74) *Attorney, Agent, or Firm* — Crowell & Moring LLP

(57) ABSTRACT

A component connection has a first component, which consists of a metal material, a ball likewise consisting of a metal material, which is welded to the first component, and a second component which has a through-hole and a collar which projects from a top side of the second component, is bent upwards and extends circumferentially around the through-hole. The two components are joined to each other such that the ball projecting from the first component projects into the through-hole provided in the second component or even partially through the through-hole. The second component is arranged so that the collar protrudes from the first component. The second component is a sandwich component which has a middle layer of a plastic (Continued)

material, the middle layer being located between an upper metal layer and a lower metal layer.

12 Claims, 1 Drawing Sheet

(51) Int. Cl.
    *B29C 65/48*     (2006.01)
    *F16B 5/01*     (2006.01)
    *F16B 5/06*     (2006.01)
    *F16B 11/00*     (2006.01)
    *F16B 35/06*     (2006.01)

(52) U.S. Cl.
    CPC ............ *F16B 5/0664* (2013.01); *F16B 35/06* (2013.01); *Y10T 403/471* (2015.01); *Y10T 403/479* (2015.01)

(58) Field of Classification Search
    CPC ........ F16B 5/0088; F16B 5/01; F16B 5/0664; F16B 11/006; F16B 35/06; F16B 37/043; Y10T 403/471; Y10T 403/472; Y10T 403/477; Y10T 403/478; Y10T 403/479; Y10T 403/7039
    USPC ................. 403/266, 267, 270, 271, 272, 361
    See application file for complete search history.

(56) References Cited

U.S. PATENT DOCUMENTS

| | | | | |
|---|---|---|---|---|
| 9,597,755 | B2 * | 3/2017 | Herzinger | F16B 5/0664 |
| 2005/0286992 | A1 | 12/2005 | Shindoh | |
| 2006/0231586 | A1 | 10/2006 | Blanchard et al. | |
| 2012/0251226 | A1 * | 10/2012 | Liu | F16B 21/071 403/280 |
| 2013/0031756 | A1 * | 2/2013 | Yuen | F16B 5/0642 24/702 |
| 2013/0269873 | A1 | 10/2013 | Herzinger et al. | |
| 2016/0256958 | A1 * | 9/2016 | Van Niekerk | B23K 26/26 |
| 2016/0303691 | A1 * | 10/2016 | Hammer | B23K 26/0884 |

FOREIGN PATENT DOCUMENTS

| | | | | |
|---|---|---|---|---|
| DE | 10 2010 028 322 | A1 | 11/2011 | |
| DE | 102010041356 | A1 * | 3/2012 | ............ F16B 5/0664 |
| DE | 10 2010 063 717 | A1 | 6/2012 | |
| DE | 102010063717 | A1 * | 6/2012 | ............ F16B 11/006 |
| DE | 10 2012 101 913 | A1 | 9/2013 | |
| JP | 2006-9996 | A | 1/2006 | |
| WO | WO 2012/084090 | A2 | 6/2012 | |

OTHER PUBLICATIONS

Chinese-language Office Action issued in counterpart Chinese Application No. 201580037245.4 dated Feb. 7, 2018 with English translation (eight pages).

International Search Report (PCT/ISA/210) issued in PCT Application No. PCT/EP2015/069117 dated Nov. 18, 2015 with English translation (six pages).

German-language Written Opinion (PCT/ISA/237) issued in PCT Application No. PCT/EP2015/069117 dated Nov. 18, 2015 (four pages).

German Office Action issued in counterpart German Application No. 10 2014 217 895.9 dated Jun. 5, 2015 (five pages).

"ThyssenKrupp Steel Europe offers intelligent solutions for the automotive industry: Volkswagen Polo R WRC is easier thanks to LITECOR®", Trade Press, Mar. 12, 2014, five pages, with unverified translation, https://www.thyssenkrupp-steel-europe.com/de/presse/pressemitteilungen/pressemitteilung-2293.html.

\* cited by examiner

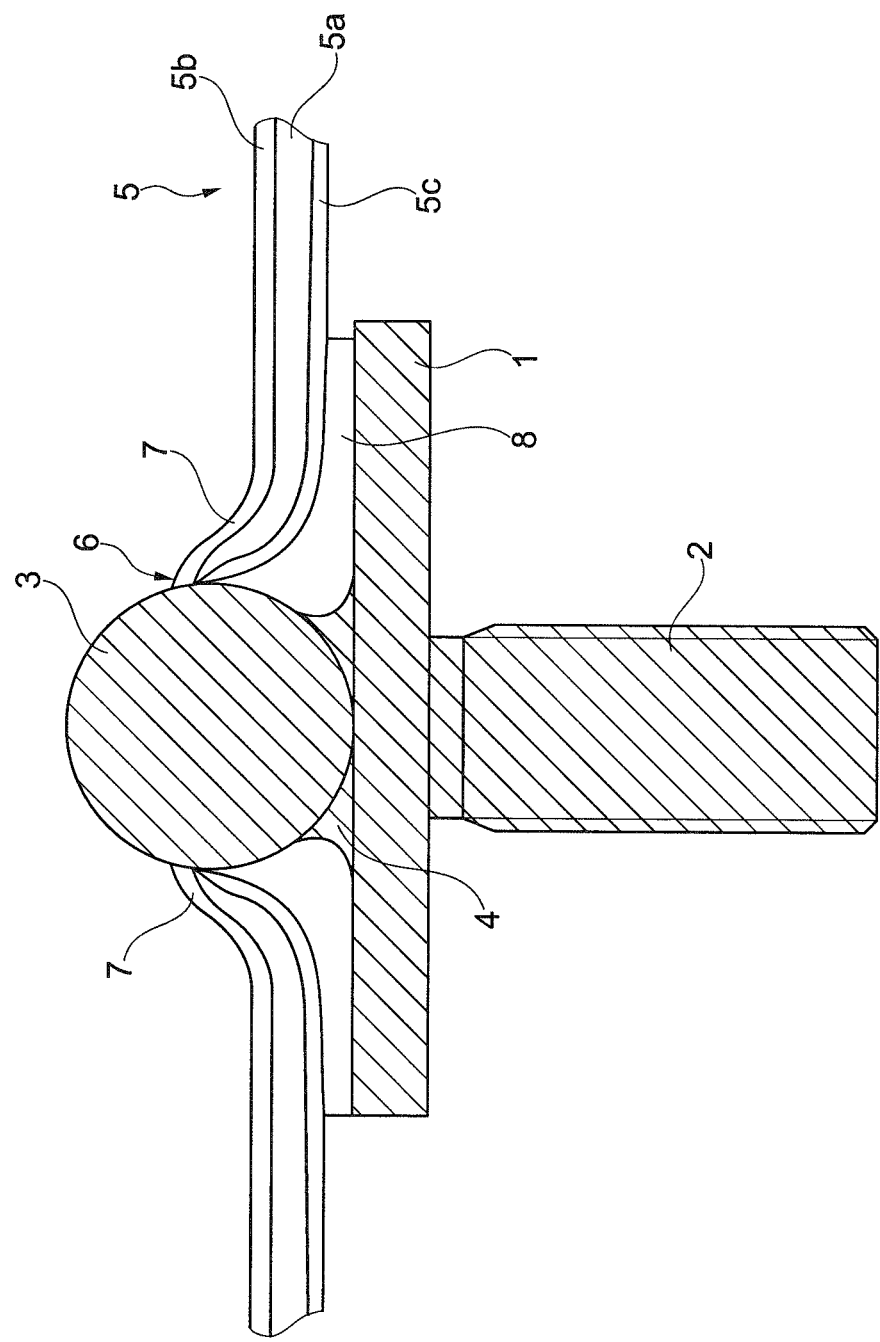

METHOD FOR PRODUCING A COMPONENT CONNECTION AND COMPONENT CONNECTION

CROSS REFERENCE TO RELATED APPLICATIONS

This application is a continuation of PCT International Application No. PCT/EP2015/069117, filed Aug. 20, 2015, which claims priority under 35 U.S.C. § 119 from German Patent Application No. 10 2014 217 895.9, filed Sep. 8, 2014, the entire disclosures of which are herein expressly incorporated by reference.

BACKGROUND AND SUMMARY OF THE INVENTION

The present invention relates to a method for producing a component connection as well as to a component connection so produced.

Such a method and such a component connection, respectively, are known from German patent document DE 10 2010 028 322 A1.

It is an object of the invention to provide a method and a component connection, respectively, which have a broader application spectrum.

This and other objects are achieved according to the invention by a method for producing a component connection with the steps of: providing a first component; welding a ball onto the first component; providing a second component which has a through hole and a bent-up collar projecting from a top side of the second component and extending circumferentially around the through hole; joining the two components such that the ball projecting from the first component projects into the through hole provided in the second component or even projects partially through the through hole, the second component being arranged such that the collar projects away from the first component, wherein a sandwich material is used for the second component, which has a center layer of a plastic material, which center layer is situated between a top metal layer and a bottom metal layer.

The starting point of the invention is a method for producing a component connection, wherein a ball is welded onto a first component. The first component and the ball may consist of a metal material, such as steel, aluminum or the like. However, in principle, the first component and the ball may also consist of a different material, for example, a plastic material, particularly a fiber-reinforced plastic material.

Furthermore, a second component is provided which has a through hole and a bent-up "collar" projecting from a top side of the second component and extending circumferentially around the through hole.

The two components are joined to one another such that the ball, which projects from the first component, projects into the through hole provided in the second component or even partially projects through the through hole. In this case, the second component is arranged such that the collar projects away from the first component.

The core of the invention consists of the fact that, in contrast to the initially mentioned German patent document DE 10 2010 028 322 A1, a "sandwich material" is used for the second component, or that the second component consists of a sandwich material at least in the area around the through hole. The sandwich material according to the invention has a center layer consisting of a plastic material, which center layer is situated between a top metal layer and a bottom metal layer. The two metal layers can be applied directly to surfaces of the center layer that face away from one another. It may, for example, be provided that the center layer consisting of a plastic material has a thickness of 0.6 mm and one metal layer, for example, the top metal layer, has a thickness of 0.25 mm, and the other metal layer, for example, the lower metal layer, has a thickness of 0.2 mm.

Such sandwich components open up multiple application possibilities, for example, in vehicle body construction. By way of the invention, a "sandwich component" (such as a sandwich-type vehicle body component) can very easily be connected with another (vehicle body) component. Sandwich components which, on one side or on both sides, are covered by a metal layer or which have a metal layer on one or both sides are, for example, considered for applications where high EMC compatibility is important, i.e. in the case of applications involving the shielding of electromagnetic radiation.

It may be provided that the ball has a certain excess measurement with respect to the collar. In this case, the collar may be called a "clamping collar", i.e. the collar will then rest in a clamping manner from the outside against an outer circumference of the ball.

According to a further development of the invention, the two components are glued to one another; i.e. an adhesive layer can be inserted between the two components. The adhesive layer may extend directly to the ball and completely fill in conceivable spaces between the collar and the "base of the ball" welded to the first component, whereby it is ensured that no moisture or condensed water can accumulate in this area.

According to a further development of the invention, the ball is welded in a contactless manner by use of a laser welding tool onto the first component. By use of a position detection device, for example, by use of a camera and an electronic analyzing system, the exact position of the ball, for example, the center of the ball can be determined or calculated. The position data provided by the position detection device can be fed to a robot guiding the laser welding tool and controlling the laser welding tool. It may be provided that the ball is connected by way of a circumferential weld seam, i.e. by way of a rotationally symmetrical weld seam, with the first component.

The through hole provided in the second component may be produced, for example, by punching or by drilling. When the through hole is punched out of the second component, the collar can simultaneously be produced by means of punching the through hole. However, this does not necessarily have to be the case. In principle, the collar can also be produced or generated after the production of the through hole by bending up an edge area of the through hole.

Other objects, advantages and novel features of the present invention will become apparent from the following detailed description of one or more preferred embodiments when considered in conjunction with the accompanying drawing.

BRIEF DESCRIPTION OF THE DRAWING

The single FIG. 1 is a schematic view of the fundamental principle of the invention.

DETAILED DESCRIPTION OF THE DRAWING

FIG. 1 shows a component connection with a first component 1, which is, for example, a metal sheet or a metal plate (for example, made of steel or aluminum), from which a function element 2 projects 2, which is a threaded bolt in this case. A face of the threaded bolt 2 can welded to the first component 1.

A ball 3 is welded onto a top side of the first component 1 facing away from the function element 2. The ball 3 is firmly bonded by way of a circumferential rotationally symmetrical weld seam 4 with the first component 1. The weld seam 4 can be produced in a robot-controlled, contactless manner by use of a laser welding tool.

A second component 5 is fitted or clipped onto the ball 3 projecting from the first component 1. The second component 5 is a "sandwich component" or a component consisting of a "sandwich-type material". The component 5 has a center layer 5a, which may consist of a plastic material, for example, a fiber-reinforced plastic material. A top layer 5b is applied to a top side of the center layer, which top layer 5b may, for example, be a metal layer. A bottom layer 5c, which may also be a metal layer, is applied to a bottom side of the center layer 5a. The metal layers may, for example, consist of aluminum or contain aluminum.

Before the fitting or clipping of the second component 5 on the ball 3, a through hole is produced, for example, by drilling or by punching. Simultaneously with producing the through hole or subsequently, i.e. after producing the through hole, an edge area of the through hole 6 is bent upward to form a circumferential collar 7. As illustrated in FIG. 1, the second component 5 is arranged such that the collar 7 projects away from the first component 1.

In the embodiment illustrated in FIG. 1, the through hole 6 defined by the collar 7 is slightly larger than the diameter of the ball 3.

As an alternative, it may be provided that the ball 3 has an excess measurement with respect to the through hole 6, so that, when the second component 5 is clipped or fitted onto the ball 3, a clamping connection is established between the ball 3 and the through hole 6 or the inner edge ("collar") of the through hole 6. In this case, the circumferential collar 7 rests clampingly against an outer circumference of the ball 3.

As illustrated in FIG. 1, an adhesive layer 8 is inserted between the first component 1 and the second component 5. The adhesive layer 8 completely fills in the space existing between the collar 7 and the first component 1, whereby it is prevented that moisture or condensed water can accumulate in this area.

The invention is suitable, for example, for a use in vehicle body construction. The second component 5 may, for example, be a vehicle body component, particularly a vehicle body component consisting of plastic and metal. By way of the ball 3 and the clamping collar 7, a function element 2 can be connected with the component 5 in a simple manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a component connection, the method comprising the acts of:
    providing a first component;
    welding a ball onto the first component;
    providing a second component having a through hole and a bent-up collar projecting from a top side of the second component and extending circumferentially around the through hole;
    joining the first and second components such that the ball projecting from the first component projects into the through hole provided in the second component, the second component being arranged such that the collar projects away from the first component, wherein
    the second component comprises a sandwich material having a center layer of plastic arranged between a top metal layer and a bottom metal layer, and
    a region of the center layer of plastic adjacent to the ball gradually decreases in thickness toward the ball.

2. The method according to claim 1, wherein in joining the first and second components the ball projects at least partially through the through hole provided in the second component.

3. The method according to claim 1, wherein the first and second components are mutually joined via an adhesive layer.

4. The method according to claim 1, wherein the act of welding the ball onto the first component is carried out in a contactless manner via a laser welding tool.

5. The method according to claim 1, wherein the through hole of the second component is produced by punching or drilling.

6. The method according to claim 5, wherein after producing the through hole, the bent-up collar is produced by bending up an edge of the through hole.

7. The method according to claim 5, wherein the bent-up collar is produced simultaneously with the punching of the through hole.

8. The method according to claim 1, wherein the bent-up collar of the second component is produced by bending up an edge area of the through hole.

9. A component connection, comprising:
    a first component of a metal material;
    a ball of a metal material welded onto the first component;
    a second component having a through hole and a bent-up collar that projects from a top side of the second component and extends circumferentially around the through hole, wherein
    the second component is a sandwich component having a center layer of a plastic material situated between a top metal layer and a bottom metal layer,
    the first and second components are mutually joined such that the ball projecting from the first component extends into the through hole provided in the second component, the second component being arranged such that the bent-up collar projects away from the first component, and
    a region of the center layer of plastic adjacent to the ball gradually decreases in thickness toward the ball.

10. The component connection according to claim 9, wherein the ball at least partially projects through the through hole of the second component.

11. The component connection according to claim 9, further comprising an adhesive layer gluing the first and second components together.

12. The component connection according to claim 9, wherein the bent-up collar is a clamping collar that rests in a clamping manner from an outside against an outer circumference of the ball.

* * * * *